US009531646B1

(12) United States Patent
Vijayaraghavan et al.

(10) Patent No.: US 9,531,646 B1
(45) Date of Patent: Dec. 27, 2016

(54) MULTI-PROTOCOL CONFIGURABLE TRANSCEIVER INCLUDING CONFIGURABLE DESKEW IN AN INTEGRATED CIRCUIT

(75) Inventors: Divya Vijayaraghavan, Mountain View, CA (US); Curt Wortman, San Jose, CA (US); Chong H. Lee, San Ramon, CA (US); Vinson Chan, San Jose, CA (US)

(73) Assignee: Altera Corporation, San Jose, CA (US)

( * ) Notice: Subject to any disclaimer, the term of this patent is extended or adjusted under 35 U.S.C. 154(b) by 852 days.

(21) Appl. No.: 12/632,744

(22) Filed: Dec. 7, 2009

(51) Int. Cl.
*G06F 3/00* (2006.01)
*H04L 12/861* (2013.01)
*G06F 5/10* (2006.01)

(52) U.S. Cl.
CPC ........ *H04L 49/90* (2013.01); *G06F 5/10* (2013.01)

(58) Field of Classification Search
None
See application file for complete search history.

(56) References Cited

U.S. PATENT DOCUMENTS

| | | | |
|---|---|---|---|
| 6,567,653 B1 | 5/2003 | Sanders | |
| 6,812,870 B1 | 11/2004 | Kryzak et al. | |
| 6,888,376 B1 | 5/2005 | Venkata et al. | |
| 6,894,530 B1 | 5/2005 | Davidson et al. | |
| 6,983,342 B2 | 1/2006 | Helenic et al. | |
| 7,064,685 B1 | 6/2006 | Xue et al. | |
| 7,091,944 B2 * | 8/2006 | Wang | G09G 5/005 345/100 |

(Continued)

FOREIGN PATENT DOCUMENTS

| | | |
|---|---|---|
| CN | 1870435 A | 11/2006 |
| EP | 1248372 | 10/2002 |

(Continued)

OTHER PUBLICATIONS

U.S. Appl. No. 12/752,641, filed Apr. 1, 2010, Vijayaraghavan et al.

(Continued)

*Primary Examiner* — Henry Tsai
*Assistant Examiner* — Aurangzeb Hassan
(74) *Attorney, Agent, or Firm* — Michael H. Lyons

(57) ABSTRACT

Embodiments include a configurable multi-protocol transceiver including configurable deskew circuitry. In one embodiment, configurable circuitry is adapted to control an allowed data depth of a plurality of buffers. In another embodiment, configurable circuitry is adapted to control a deskew character transmit insertion frequency. In another embodiment, a programmable state machine is adapted to control read and write pointers in accordance with selectable conditions for achieving an alignment lock condition. In another embodiment, configurable circuitry is adaptable to select between logic and routing resources in the transceiver and logic and routing resources in a core of the IC in which the transceiver is implemented for controlling at least certain deskew operations. In another embodiment, configurable selection circuitry allows deskew processing to occur in a data path either before or after clock compensation processing depending on a communication protocol for which the transceiver is to be configured.

16 Claims, 11 Drawing Sheets

(56) References Cited

U.S. PATENT DOCUMENTS

| | | | |
|---|---|---|---|
| 7,193,994 B1* | 3/2007 | Payson | H04L 7/02 |
| | | | 370/380 |
| 7,362,771 B1* | 4/2008 | Lo | H04L 49/90 |
| | | | 370/401 |
| 7,403,035 B1 | 7/2008 | Shumarayev | |
| 7,454,537 B1* | 11/2008 | Xue | 710/52 |
| 7,519,747 B1* | 4/2009 | Cory | G06F 5/10 |
| | | | 710/52 |
| 7,538,578 B2 | 5/2009 | Venkata et al. | |
| 8,149,884 B2* | 4/2012 | Teramoto | H04J 3/0632 |
| | | | 370/252 |
| 8,165,191 B2 | 4/2012 | Vijayaraghavan et al. | |
| 8,208,380 B1* | 6/2012 | Nachum | H04L 49/901 |
| | | | 370/235 |
| 2002/0064379 A1* | 5/2002 | Kawashima | G11B 19/04 |
| | | | 386/269 |
| 2002/0094033 A1 | 7/2002 | Baggen et al. | |
| 2002/0152317 A1 | 10/2002 | Wang et al. | |
| 2003/0016697 A1* | 1/2003 | Jordan | H04J 3/1617 |
| | | | 370/466 |
| 2003/0091050 A1* | 5/2003 | Numata | H04L 47/10 |
| | | | 370/392 |
| 2003/0217215 A1 | 11/2003 | Taborek, Sr. et al. | |
| 2004/0156463 A1* | 8/2004 | Goodloe | H04J 3/0626 |
| | | | 375/362 |
| 2005/0007996 A1 | 1/2005 | Venkata et al. | |
| 2005/0058187 A1 | 3/2005 | Groen et al. | |
| 2005/0141661 A1* | 6/2005 | Renaud et al. | 375/372 |
| 2005/0188146 A1* | 8/2005 | Teo | G06F 5/10 |
| | | | 711/5 |
| 2006/0107154 A1* | 5/2006 | Bansal | G01R 31/31716 |
| | | | 714/738 |
| 2006/0209722 A1 | 9/2006 | Takeo et al. | |
| 2006/0230215 A1* | 10/2006 | Woodral | G06F 5/12 |
| | | | 710/310 |
| 2006/0233172 A1 | 10/2006 | Venkata et al. | |
| 2006/0265083 A1* | 11/2006 | Otsu | G06F 17/30053 |
| | | | 700/1 |
| 2007/0047593 A1* | 3/2007 | Gupta | H04J 3/0623 |
| | | | 370/539 |
| 2007/0139085 A1* | 6/2007 | Elliot | G06F 1/12 |
| | | | 327/100 |
| 2008/0013609 A1 | 1/2008 | Daxer et al. | |
| 2008/0130814 A1* | 6/2008 | Li | G06F 13/4217 |
| | | | 375/372 |
| 2009/0019193 A1* | 1/2009 | Luk | G06F 5/06 |
| | | | 710/52 |
| 2009/0132733 A1* | 5/2009 | Codrescu et al. | 710/40 |
| 2009/0241074 A1* | 9/2009 | Tanimoto | G06F 17/504 |
| | | | 716/103 |
| 2010/0005199 A1* | 1/2010 | Gadgil | G06F 13/28 |
| | | | 710/22 |
| 2010/0008460 A1* | 1/2010 | Zhang et al. | 375/376 |
| 2010/0027540 A1* | 2/2010 | Sato | H04L 12/2602 |
| | | | 370/389 |
| 2010/0128800 A1* | 5/2010 | He | H04N 21/235 |
| | | | 375/240.25 |
| 2010/0162265 A1 | 6/2010 | Heddes | |
| 2010/0215086 A1 | 8/2010 | Vijayaraghavan et al. | |
| 2011/0038239 A1* | 2/2011 | Kiyose | G11B 7/0956 |
| | | | 369/44.32 |
| 2011/0292932 A1 | 12/2011 | Nichols et al. | |

FOREIGN PATENT DOCUMENTS

| | | |
|---|---|---|
| EP | 1715585 | 10/2006 |
| JP | 2006195870 A | 7/2006 |
| JP | 2006302277 A | 11/2006 |

OTHER PUBLICATIONS

International Search Report and Written Opinion for App. No. PCT/US2009/059874, dated Apr. 28, 2010, pp. 1-11.

U.S. Appl. No. 12/288,178, filed Oct. 17, 2008, Vijayaraghavan et al.

Frazier, H. "40/100G Ethernet Aggregation at the Physical Layer," Nov. 13, 2007, pp. 1-12.

Green, L. "Lane Bonding Considerations," IEEE 802.3ba Interim Meeting . . . Portland, Jan. 23-25, 2008, pp. 1-14.

Malpass, T. et al. "PBL Model Update," IEEE 802.3 Higher Speed Study Group, Nov. 12-15, 2007, Huawei Technologies Co., Ltd, pp. 1-28.

Nicholl, G. "CTBI: A simple lane bonding mechanism for both 40GE and 100GE Interfaces," Cisco, pp. 1-19.

Gustlin, M. "MLD (CTBI) Updates—MTTFPA," Jan. 2008, pp. 1-27.

Gustlin, M. et al. "100GE/40GE skew budget," IEEE 802.3ba TF Dallas, Nov. 2008, pp. 1-21.

U.S. Appl. No. 12/552,069, filed Sep. 1, 2009, Wortman, Curt.

Japanese Office Action issued in Japanese Patent Application No. 2011-532149 dated Dec. 2, 2013 (with English translation), 5 pages.

Chinese Office Action and Search Report issued in Chinese Patent Application No. 200980140730.9 dated Apr. 23, 2013 (with English translation), 21 pages.

Office Action issued in Chinese Patent Application No. 200980140730.9 dated Oct. 28, 2013 (with English translation), 7 pages.

European Search Report and Search Opinion issued in European Patent Application No. 09821034.7 dated Aug. 19, 2014, 7 pages.

Official Communication issued in European Patent Application No. 09821034.7 dated Nov. 4, 2015 (3 pages).

* cited by examiner

MULTI-PROTOCOL CONFIGURABLE TRANSCEIVER INCLUDING CONFIGURABLE DESKEW IN AN INTEGRATED CIRCUIT

BACKGROUND

This invention relates generally to the area of system interconnect technology.

As CPU speeds approach the multi-gigahertz range, system designers increasingly focus on system interconnect as the primary bottleneck at the chip-to-chip, board-to-board, backplane and box-to-box levels. System interconnect has evolved from utilizing parallel I/O technology with source-synchronous clocking or system-synchronous clocking to multi-gigabit serial I/O with clock-data recovery ("CDR"). Channel aggregation bonds individual serial I/O lanes to create a multi-lane link, transcending the bandwidth limitations of single transceiver channels and providing the high bandwidth required by next generation serial protocols such as 40/100 Gigabit Ethernet and PCI Express Gen 3. However, various communication protocols have different functional requirements. At the same time, there is an increasing need for system designers to have flexibility in designing systems to work with one particular protocol versus another. Moreover, protocols continue to evolve, so there is a need for transceivers that can be reconfigured to meet the needs of future potential variations in high speed communication protocols. Such protocols may change during the product life of an integrated circuit ("IC"); therefore there is a need for a configurable transceiver design flexible enough to potentially accommodate such changes.

Deskew represents one of the processing stages in a high speed transceiver. However, different protocols have different deskew techniques. For example, many protocols rely on deskew characters to align data across multiple lanes. The characters and the insertion frequency of characters may vary depending on the protocol. Moreover, the preferred buffer depth might vary depending on the protocol. Also, depending on the application and/or protocol, it might be necessary to take into account one or both of dynamic and static skew, separately or in combination. Furthermore, there may be a need for flexibility in controlling a transceiver from either user-defined logic in the core and/or from configurable control circuitry in the transceiver itself. In addition, it might be required that deskew processing occur either before or after other processing (e.g. clock compensation processing) depending upon the protocol.

For these reasons, a configurable transceiver with configurable deskew circuitry that can be re-configured to adapt to different deskew requirements and user control requirements is needed.

SUMMARY

One embodiment of the present invention includes a configurable multi-protocol transceiver implemented in an integrated circuit ("IC"), the transceiver including configurable deskew circuitry. The transceiver has various configurable settings to facilitate effectively adapting transmit and/or receive communications to accommodate a selected one of a plurality of high-speed communication protocols and/or adapt to different implementations in which a deskew block addresses either just static skew or both static and dynamic skew. In one embodiment, configurable circuitry is adapted to control an allowed data depth of a plurality of buffers. In another embodiment, configurable circuitry is adapted to control a deskew character transmit insertion frequency. In another embodiment, a programmable state machine is adapted to control read and write pointers in accordance with selectable conditions for achieving an alignment lock condition. In another embodiment, configurable circuitry is adaptable to select between logic and routing resources in the transceiver and logic and routing resources in a core of the IC in which the transceiver is implemented for controlling at least certain deskew operations. In another embodiment, configurable selection circuitry allows deskew processing to occur in a data path either before or after clock compensation processing depending on a selected communication protocol for which the transceiver is to be configured.

BRIEF DESCRIPTION OF THE DRAWINGS

For purposes of illustration only, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
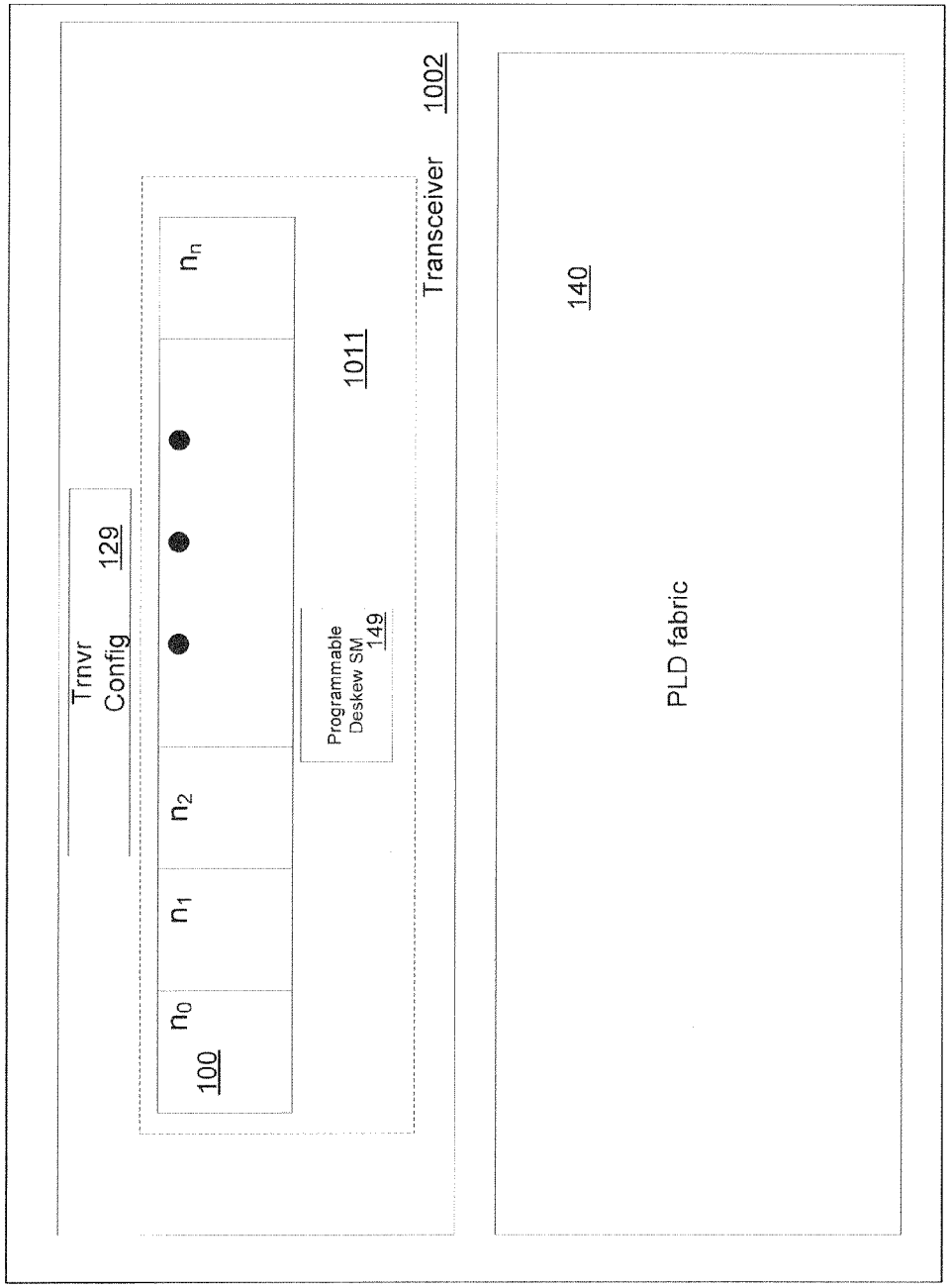
FIG. 1 illustrates a programmable logic device ("PLD") including a multiprotocol configurable transceiver, the transceiver including configurable deskew circuitry in accordance with an embodiment of the present invention.

FIG. 1 illustrates a programmable logic device ("PLD") 1001 including a multiprotocol configurable transceiver 1002, transceiver 1002 including configurable deskew circuitry in accordance with an embodiment of the present invention. For purposes of illustration, embodiments of the invention will be described in the context of implementation in a PLD. Those skilled in the art will understand that embodiments of the invention may be implemented in any integrated circuit ("IC") that supports transceiver configuration. Transceiver 1002 includes a transceiver configuration interface 129 and configurable deskew processing circuitry 1011. The configurable deskew processing circuitry 1011 includes a plurality of deskew lanes $n_0$ to $n_n$ and a programmable deskew state machine 149. Lanes $n_0$ to $n_n$ include an exemplary lane 100. Lane 100 includes lane transmit deskew circuitry 100T as shown and described in FIG. 2 and lane receive deskew circuitry 100R as shown and described in FIG. 6. PLD 1001 also includes a "core" or "fabric" 140 which, for certain operations, interacts with transceiver 1002 as will be further described herein.

Figure 2:
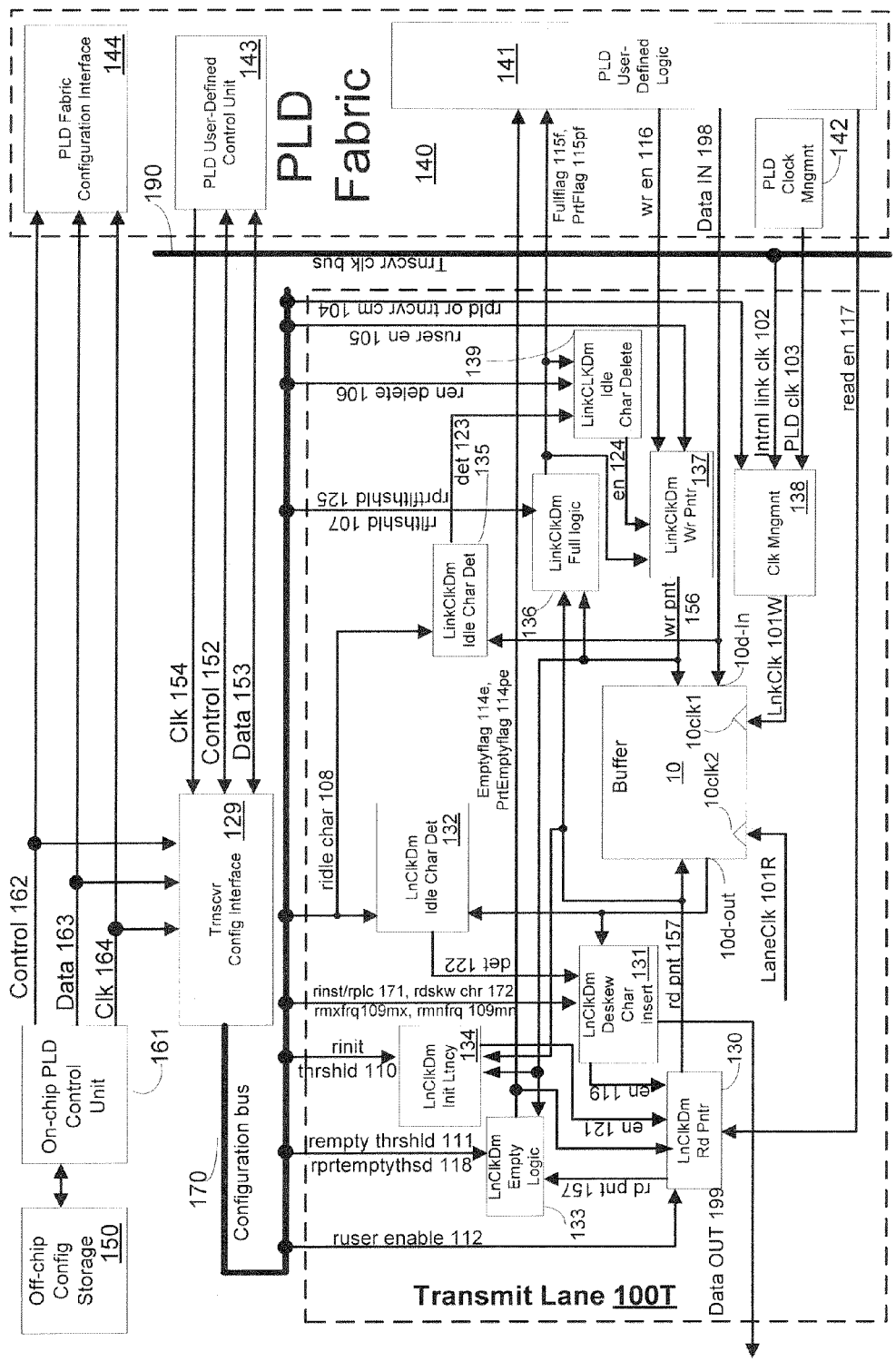
FIG. 2 illustrates transmit lane circuitry showing further details of the PLD transceiver illustrated in FIG. 1.

FIG. 2 illustrates details of transmit lane 100T in the context of further details of transceiver 1002 and PLD 1001. In a typical application, configuration data is stored off-chip (i.e. outside of PLD 1001) in a configuration memory device such as off-chip configuration memory device 150. When a system of which PLD 10001 is a part is powered up, configuration data loads onto PLD 1001 at PLD control unit 161. Unit 161 provides control signal 162, data signal 163, and clock signal 164 to both transceiver configuration interface 129 and PLD fabric configuration interface 144. Transceiver configuration interface 129 detects and utilizes that portion of configuration data 163 that is relevant to configuring transceiver 1002 and PLD configuration interface 144 detects and utilizes that portion of the configuration data 163 that is relevant to configuration of PLD fabric 140. Control signal 162 is utilized to freeze and start configuration registers as needed during a configuration sequence. Clock signal 164 is used to clock the configuration data 164. Other transceiver configuration data, configuration data 153, originates on-chip in PLD user-defined control unit 143. Clock signal 154 is used to clock configuration data 153 and control signal 152 is used to control the process of providing configuration data 153 to transceiver configuration interface 129. Transceiver configuration interface 129 provides configuration data over configuration bus 170.

Transmit lane circuitry 100T includes initial latency logic 134, empty logic 133, idle character detection logic 132 and 135, deskew character insert logic 131, read pointer logic 130, buffer 10, full logic 136, idle character delete logic 139, write pointer logic 137, and clock management 138. Logic circuitry 133, 134, 130, 131, and 132 are clocked by lane based clock signal 101R while logic circuitry 135, 136, 139, and 137 are clocked by link based clock signal 101W which synchronizes operations across several lanes. Buffer 10 receives lane based clock signal 101R at input 10clk2 to clock read operations and a link based clock signal 101W to clock write operations.

As used herein, the terms "logic" and "circuitry," unless otherwise specified, are broad enough to include circuitry that has programmable logic configurable to implement the referenced logical functions. Such circuitry may or may not also include portions of hard-wired, non-programmable logic. These terms may also refer to more general purpose processing circuitry that relies in whole or in part on software to carry out the indicated logic. Those skilled in the art will appreciate that, depending on the speed and/or other requirements of a specific application, one particular implementation may utilize special purpose circuitry with hard-wired logic and another particular implementation may use, in whole or in part, programmable logic that has been programmed by configuration data to carry out specific logical functions and/or may use more general purpose circuitry in conjunction with executable software instructions.

Initial latency logic 134 receives an initial threshold signal 110 from configuration bus 170. Logic 134 also receives read pointer signal 157, and write pointer signal 156. As one skilled in the art will understand, in a typical example, write pointer 156 and read pointer 157 will be multi-bit signals that specify respective memory locations for the write and read operations performed on a memory of buffer 10. Circuitry 134 carries out the following logic: the output of block 134, enable 121, is initially a logical low value (or "false") until the value of write pointer 156 minus the value of read pointer 157 is greater than the value specified by initial threshold signal 110 (more precisely, block 134 determines the number of memory locations between the locations specified by write pointer 156 and read pointer 157 and then compares that to initial threshold 110). Once that occurs, the output of block 134, enable 121, switches to a logical high. As illustrated, enable 121 is provided to read pointer logic 130. Enable 121 will switch to low again if the difference between the write pointer 156 and read pointer 157 falls below the empty threshold again. However, read pointer logic 130 will not listen to the output of block 134 after its initial switch to high unless empty flag 114e subsequently becomes high, as explained further below.

Empty logic 133 receives the following values: empty threshold 111, partially empty threshold 118, write pointer 156 and read pointer 157. Empty logic 133 outputs two values based on these inputs: Empty flag 114e and partially empty flag 114pe. Empty flag 114e is a logical high value if the value of write pointer 156 minus the value of read pointer 157 (more precisely, block 134 determines the number of memory locations between the locations specified by write pointer 156 and read pointer 157, this will be understood herein unless stated otherwise) is less than the value specified by empty threshold 111. Partially empty flag 114pe is a logical high value if the value of write pointer 156 minus the value of read pointer 157 is less than the value specified by partially empty threshold 118. These values (114e and 114pe) are provided to PLD user-defined logic 141 and to read pointer logic 130.

Idle character detection logic 132 receives idle character 108 and receives the data output by buffer 10 at its data output 10d-out. When block 132 detects the presence of an idle character in the data stream, it outputs a logical high value for detect signal 122 to deskew character insert logic 131.

Deskew character insert block 131 receives detect signal 122 from block 132 and also receives deskew character 172, insert/replace signal 171, and deskew character frequency minimum and maximum 109mn and 109mx from configuration bus 170. Block 131 uses these signals to determine how and when to put deskew characters into the data output by buffer 10 and the resulting data stream is provided by block 131 as Data OUT 199. Specifically, block 131 puts a deskew character identified from signal 172 into the data stream every "x" clock cycles where "x" is between the value specified by 109mn and the value specified by 109mx. Insert/replace signal 171 determines whether the deskew character is inserted into the data stream in addition to any present idle characters or whether the deskew character replaces the idle character in the data stream. Block 131 provides enable signal 119 to read pointer logic 130. When signal 171 indicates that a deskew character should be inserted in the data stream in addition to (rather than in place of) an idle character, then enable 119 put out by block 131 is a logical low value indicating that read pointer 157 should not advance. Otherwise, enable 119 remains a logical high.

Read pointer logic 130 determines read pointer 157. Specifically, each clock cycle, the value of read pointer 157 is either advanced to specify the next memory location within buffer 10 or read pointer 157 is held to the same value as it was on the previous clock cycle. Read pointer logic 130 makes this determination based on the following input signals: user enable 112, enable 117, enable 119, enable 121, empty flag 114$e$ and partially empty flag 114$pe$. As one skilled in the art will appreciate, the exact logic used by logic 130, may vary by application.

In one embodiment, read pointer logic initially listens to enable signal 121 received from initial latency logic 134. When signal 121 is low, read pointer logic 130 holds read pointer signal 157 constant and does not advance its value. Once signal 121 goes high for the first time after system power up, read pointer logic circuitry 130 no longer listens to enable signal 121. However, if empty flag 114$e$ received by read pointer logic 130 is a logical high value (indicating an empty condition), then read pointer logic 130 disables the read pointer (by holding the value of read pointer signal 157 from advancing) and again listens to enable signal 121, which will be low when buffer 10 is empty. Read pointer 130 holds read pointer signal 157 from advancing until enable signal 121 again goes high. If user enable signal 112 is low, then logic 130 controls read pointer 157 based on signals enable 119, enable 120, and empty flag 114$e$. Empty flag 114$e$ going high always triggers logic 130 to disable read pointer 157. If signal 121 (from initial latency logic 134) has gone high and no reset condition occurs (i.e. empty flag 114$e$ remains low), then logic 130 continues to advance read pointer 157 unless enable signal 119 from deskew insert logic 131 goes low. In an alternative embodiment, partially empty flag 114$pe$ can be used to disable read pointer 157 when idle characters are detected. This could be accomplished by, for example, modifying the illustrated embodiment to provide a connection from logic 133 to logic 131 and configuring logic 131 such that enable signal 119 is low whenever an idle character is detected and partially empty flag 114$pe$ is high.

If user enable signal 112 is a logical high, then read pointer logic 130 listens to enable signal 117 received from PLD user-defined logic 141. In one embodiment, when partially empty flag 114$pe$ goes high, read pointer logic 130 does not immediately disable (i.e. begin holding the value of) read pointer 157. Rather, a period of time is given for PLD user-defined logic 141 to react to the high value of partially empty flag 114$pe$ and disable the read pointer by switching enable signal 117 from high to low. In this embodiment, if PLD user logic 141 does not disable the read pointer when a condition of partially empty occurs, empty flag 114$e$ still provides a backup fail safe. Specifically, even if user enable signal 112 is high and the read enable signal 117 from logic 141 is high, read pointer logic 130 will hold the read pointer signal 157 if empty flag 114$e$ goes high.

Turning now to the circuitry in transmit lane 100T that is in a link clock domain, full logic 136 receives the following values: full threshold 107, partially full threshold 125, write pointer 156 and read pointer 157. Full logic 136 outputs two values based on these inputs: Full flag 115$f$ and partially full flag 115$pf$. Full flag 115$f$ is a logical high value if the value of write pointer 157 minus the value of read pointer 156 is greater than the value specified by full threshold 107. Partially full flag 115$pf$ is a logical high value if the value of write pointer 156 minus the value of read pointer 157 is greater than the value specified by partially full threshold 125. These values (115$f$ and 115$pf$) are provided to PLD user-defined logic 141, to idle character delete logic 139 and to write pointer logic 137.

Idle character detection logic 135 receives idle character signal 108 which provides the identity of an idle character. Detection circuitry 135 also receives the incoming data signal Data IN 198 from the core (or, more immediately, from a prior transceiver processing block not separately shown). When block 135 detects an idle character in the data stream, it outputs a logical high value in detect signal 123 which is provided to idle character delete logic 139.

Idle character delete logic 139 receives detect signal 123 from block 135, delete enable signal 106 from configuration bus 170, and full flag 115$f$ and partially full flag 115$pf$ from full logic 136. If delete enable configuration signal 106 is high then idle character delete logic 139 tries to delete idle characters when they are detected by setting enable signal 124 low when detect signal 123 is high and when either partially full flag 115$pf$ or full flag 115$f$ is high. When delete enable 106 is low, idle character delete logic 139 is disabled. Note that when full flag 115$f$ is high, write pointer logic 137 will effectively delete any character (whether or not an idle character) by, as explained below, holding the write pointer.

Write pointer logic 137 determines write pointer 156. Specifically, each clock cycle, the value of write pointer 156 is either advanced to specify the next memory location within buffer 10 or it is held to the same value it was on the previous clock cycle. Write pointer logic 137 makes this determination based on the following input signals: user enable 105, enable 116, enable 124, full flag 115$e$ and partially full flag 115$pe$.

If user enable 105 is high, then write pointer logic 137 advances write pointer 156 if full flag 115$f$ is low and write enable 116 is high. Otherwise, logic 137 holds write pointer 156. Note that when user enable 105 is high, PLD logic 141 would ordinarily be expected to switch write enable 116 to low if partially full flag 115$pf$ is high. However, even if this does not occur, full flag 115$f$ being provided directly to write pointer logic 137 provides a fail-safe in that write pointer logic 137 will hold the write pointer if full flag 115$f$ is high even if user enable 105 and write enable 116 are both high. If user enable 105 is low, then write pointer 137 advances write pointer 156 if enable 124 (from idle character delete logic 139) is high and if both full flag 115$f$ and partially full flag 115$pf$ are low.

Clock management logic 138 selects between PLD clock 103 and internal link clock 102 under the control of signal 104 which indicates which clock should be selected. The selected clock is provided as link clock 101W to write clock input 10$clk$1 of buffer 10.

In a particular application, routing across parts of PLD fabric 140 may be used to bond a particular group of lanes together in a single link. In such cases, signal 104 will generally be set to select PLD clock 103 as link clock 101W. On the other hand, if only routing within the transceiver is being used, then signal 104 will generally be set to select internal link clock 102 as link clock 101W.

Those skilled in the art will appreciate that the embodiment illustrated in FIG. 2 permits advantageous configurability of various parameters that allow transmit lane circuitry 100T to be adapted for use with various communication protocols. For example, full, partially full, empty and/or partially empty thresholds can allow the effective data depth of buffer 10 to be adjusted. Some protocols might require a greater buffer depth than others to operate at peak efficiency. Moreover, the illustrated embodiment allows effective buffer depth to be programmed on a lane by lane basis. As another example, the preferred initial latency threshold might vary from protocol to protocol. As yet another example, different protocols may have different requirements for the frequency of deskew character insertion. These and other parameters can be adjusted by selecting various configuration values for the signals provided on transceiver configuration bus 170 from transceiver configuration interface 129. The configuration of and processing flow for the embodiment of FIG. 2 will now be further discuss with reference to FIGS. 3-5.

Figure 3:
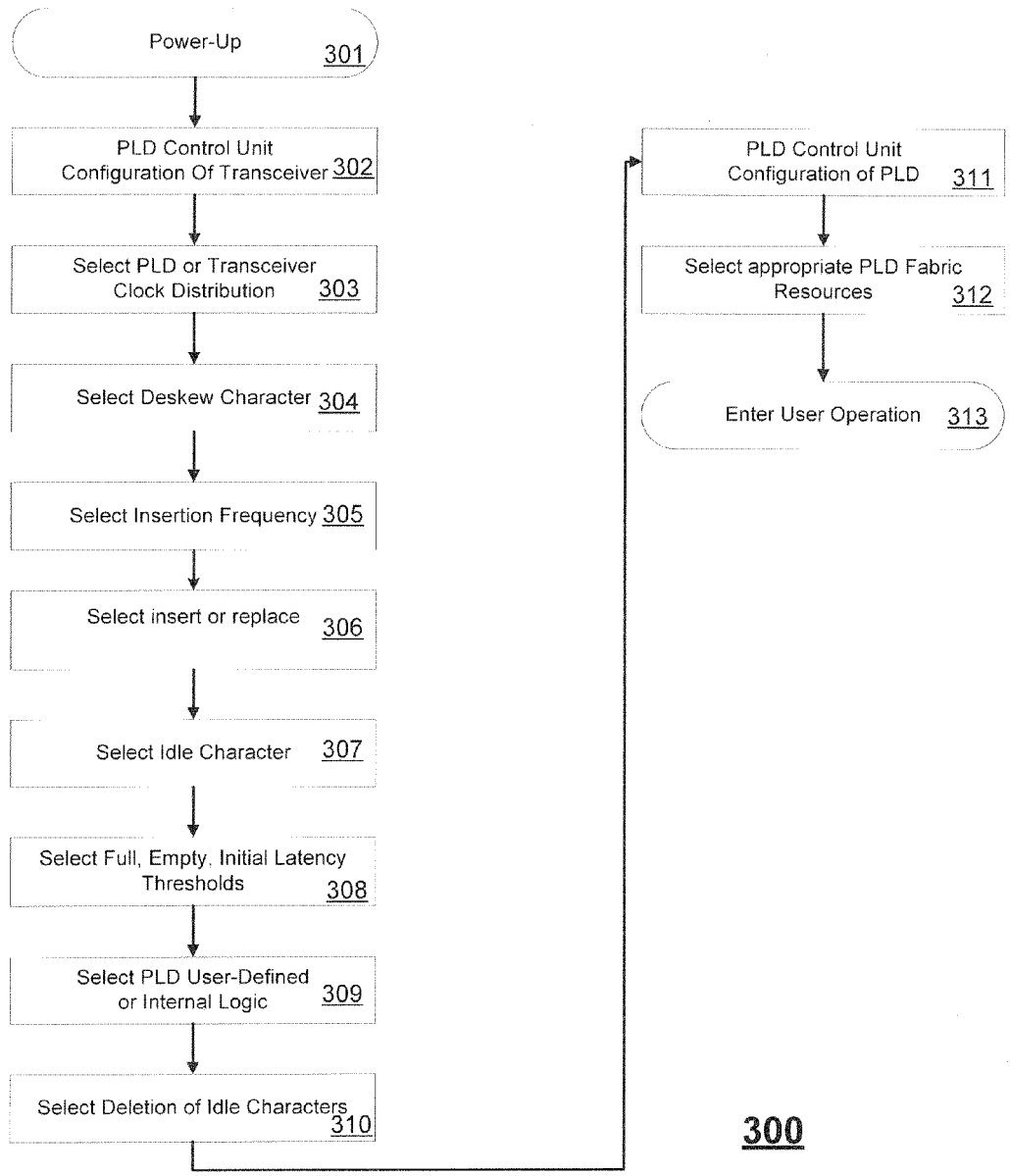
FIG. 3 illustrates a process flow of a configuration sequence for configuring settings for the transmit lane circuitry illustrated in FIG. 2.

FIG. 3 illustrates a process flow 300 of a configuration sequence for configuring settings for transmit lane circuitry 100T illustrated in FIG. 2. At step 301, the system including PLD 1001 of FIG. 1, which in turn includes the further details illustrated in FIG. 2, is powered up. Step 302 begins configuration of transceiver 1001 by PLD control unit 161 and/or PLD user defined control unit 143. Step 303 determines the setting for signal 104 which selects between PLD clock 103 and internal link clock 102 to run the link clock domain circuitry including the read operation of buffer 10. Step 304 selects one or more deskew characters to be provided by signal 172. Step 305 selects minimum and maximum deskew character insert frequencies to be communicated by signals 109*mn* and 109*max*. Step 306 selects the setting for signal 171 which determines whether logic 131 inserts the deskew character into the data stream or replaces an idle character in the data stream with the deskew character. Step 307 selects one or more characters to be provided by signal 108. Step 308 selects full, partially full, empty, partially empty, and initial latency thresholds provided, respectively, by signals 107, 125, 111, 118, and 110. Step 309 selects the setting of user enable signals 112 and 105 which in turn determines whether read pointer logic 130 and write pointer logic 137 rely, respectively, on enable signals 117 and 116. Step 310 selects the setting of delete enable signal 106 which determine whether logic 139 will attempt to delete idle characters when they are detected by logic 135. Steps 311 and 312 carry out configuration of the rest of PLD 1001 and select resources to be utilized by PLD 1001. Then, at step 313, PLD 1001 is ready for user operation. It will be appreciated by those skilled in the art that in a particular implementation, the order of the steps in a configuration sequence may be varied from that shown in FIG. 3 without departing from the spirit and scope of the present invention.

Figure 4:
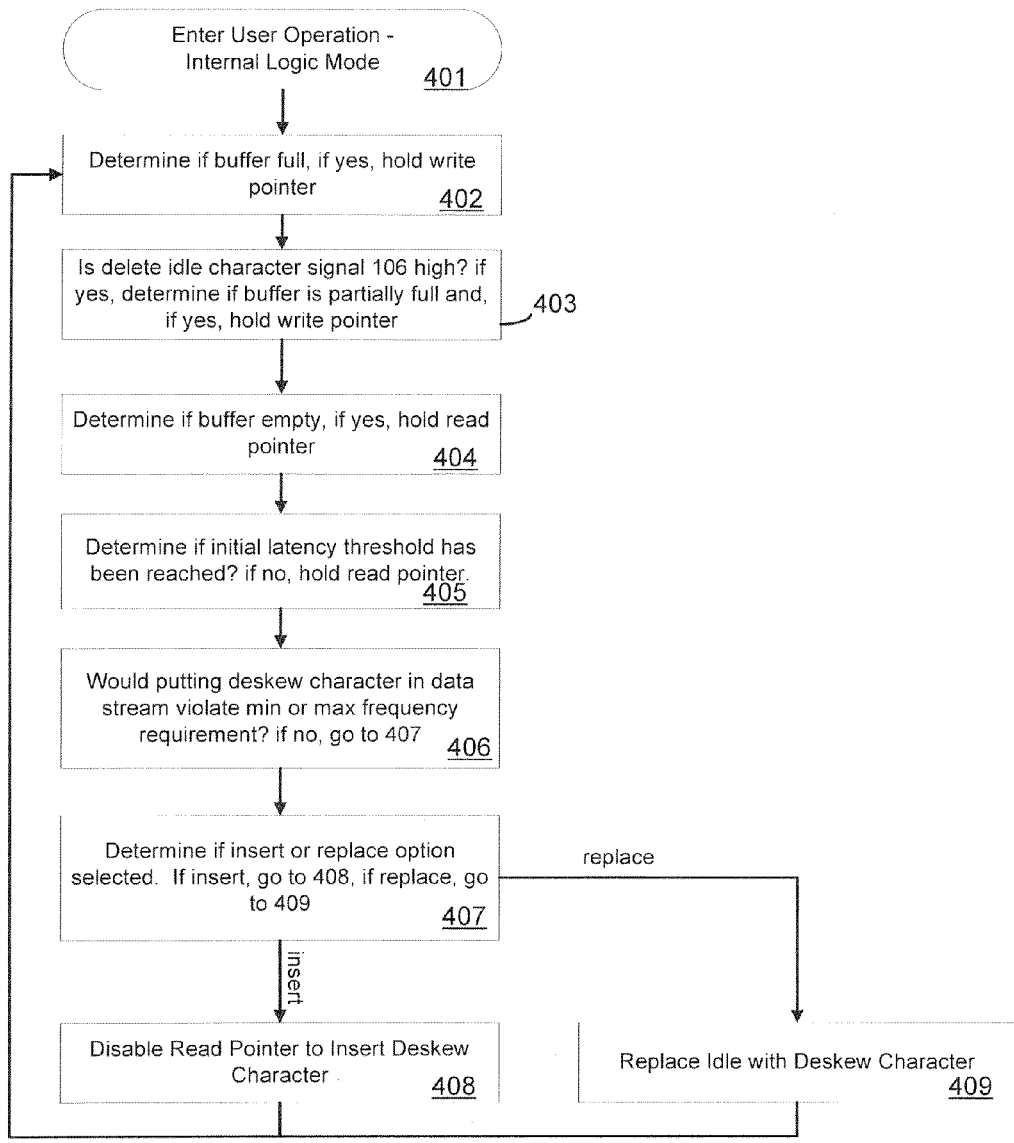
FIG. 4 illustrates a process for controlling the transmit lane circuitry of FIG. 2 when user operation relies on logic internal to the transceiver.

FIG. 4 illustrates a process 400 for controlling transmit lane circuitry 100T of FIG. 2 when the user operation relies on logic internal to transceiver 1002 for operation (i.e., it shows processing logic when user enable signals 112 and 114 are low). Step 401 begins the process. Step 402 determines if buffer 10 is full. If yes, the write pointer is held from advancing. Step 403 determines if deletion of idle characters signal 106 is high and, if yes, then it determines if buffer 10 is "partially" full and, if yes, the write pointer is held from advancing. Step 404 determines if buffer 10 is empty and, if yes, the read pointer is held from advancing. Step 405 determines if the initial latency threshold has been reached. If not, then the write pointer is held from advancing. Step 406 monitors whether adding a deskew character to the data stream would violate minimum or maximum conditions for deskew character frequency. If no, then step 406 allows process 400 to proceed to step 407. Step 407 determines whether signal 171 indicates that deskew characters should be inserted into the data stream in addition to or in place of idle characters. If by inserting in addition to, then the process goes to step 408. At step 408, the read pointer is held so that a deskew character may be inserted into the data stream. If step 407 determines that deskew characters should be put into the data stream in place of idle characters, then step 409 replaces idle characters with deskew characters. The steps of process 400 continue repeating as indicated by the feedback arrows from steps 408 and 409 to step 402.

As those skilled in the art will appreciate, in a particular implementation, the order of the steps may be varied from that shown in FIG. 4 without departing for the spirit and scope of the present invention. Also, the steps are not necessarily performed in order. For example, steps such as 402, 403, 404, and 406 may represent ongoing processes that can preempt or happen in parallel with other steps at any given time. For example, in one embodiment, anytime a full state is reached, write pointers are disabled and anytime an empty state is reached, read pointers are disabled. Other steps may only be performed at particular times. For example, once the initial latency threshold is reached the first time, step 405 does not need to continue determining whether that threshold has been reached unless a condition resets the applicable initial latency logic (for example, reaching an "empty" condition). These and other variations, as will be appreciated by one skilled in the art, do not depart from the spirit and scope of the present invention.

Figure 5:
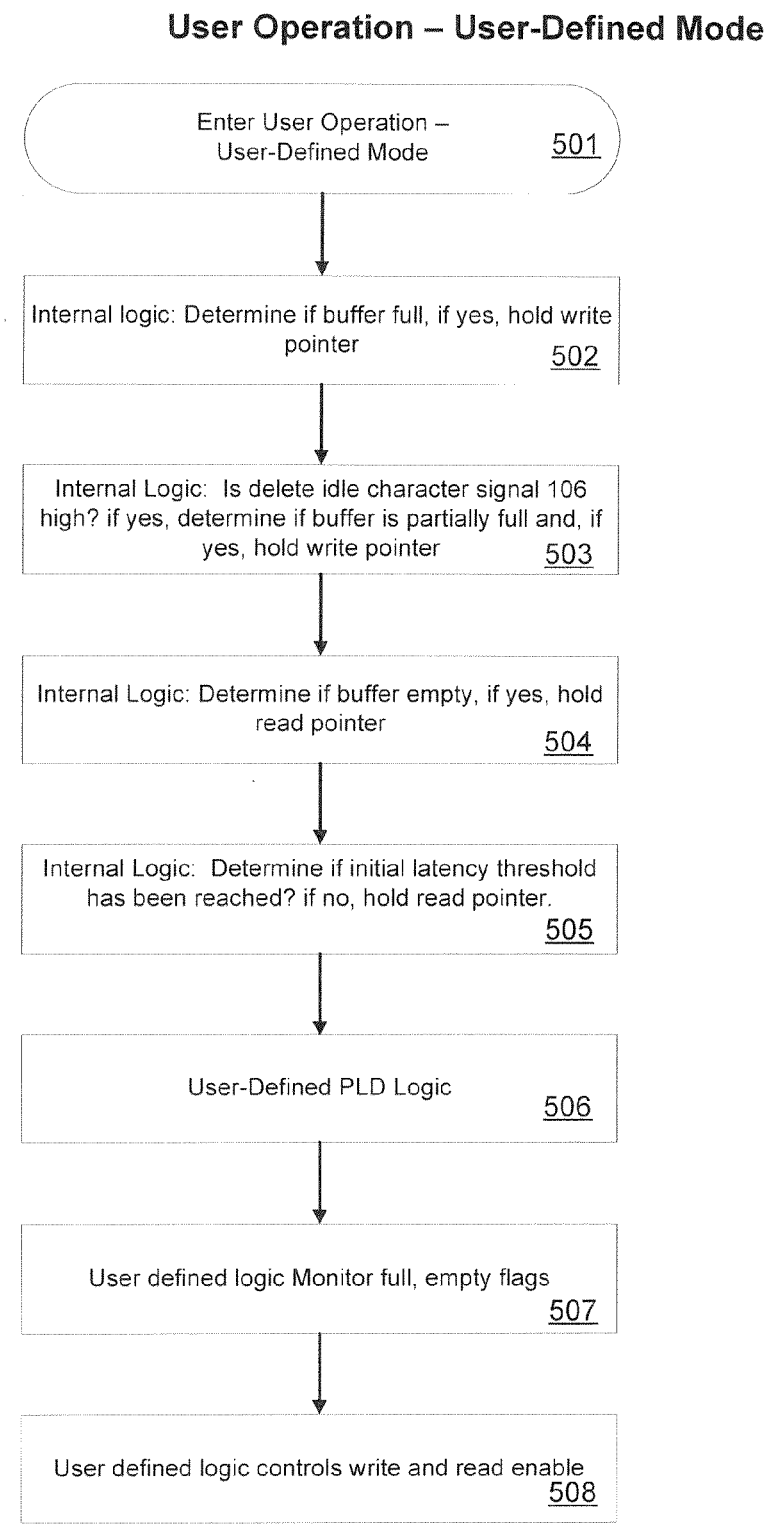
FIG. 5 illustrates a process for controlling the transmit lane circuitry of FIG. 2 when user operation relies in part on user-defined logic in the PLD core.

FIG. 5 illustrates a process 500 for controlling transmit lane circuitry 100T of FIG. 2 when the user operation relies in part on user defined logic in the core 140 of PLD 1001. In this exemplary embodiment, some logic internal to transceiver 1002 still has priority for controlling read and write pointers 157 and 156. However, subject to those internal logic control priorities, read and write pointers 157 and 156 may be controlled from user-defined logic 141 in fabric 140 of PLD 1001. In one embodiment, process 500 applies when user enable signals 112 and 114 are high. Step 501 begins the process. Step 502 uses internal logic (i.e., internal to transceiver 1002) to determine if buffer 10 is full. If yes, the write pointer is held from advancing. Step 503 uses internal logic to determine if deletion of idle characters signal 106 is high and, if yes, then it determines if buffer 10 is "partially" full and, if yes, the write pointer is held from advancing. Step 504 uses internal logic to determine if buffer 10 is empty and, if yes, the read pointer is held from advancing. Step 505 uses internal logic to determine if the initial latency threshold has been reached. If not, then the write pointer is held from advancing. If steps 502-505 have not indicated that read and/or write pointers should be held from advancing, then process 500 moves to step 506 and looks to user-defined logic in the PLD core to determine whether to hold or advance read and/or write pointers. Step 507 monitors full, partially full, empty and partially empty flags and step 508 determines whether to hold or advance read and write pointers by controlling the values of read enable 117 and write enable 116.

As those skilled in the art will appreciate, in a particular implementation, the order of the steps may be varied from that shown in FIG. 5 without departing for the spirit and scope of the present invention. Also, the steps are not necessarily performed in order. For example, once the process reaches step 508, steps 502, 503, and 504 may be ongoing and could preempt any control signals from PLD core 140 resulting from step 508. Moreover, other steps may only be performed at particular times. For example, once the initial latency threshold is reached the first time, step 505 does not need to continue determining whether that threshold has been reached unless a condition resets the applicable initial latency logic (for example, reaching an "empty" condition). However, once the initial latency logic is reset, step 505 may again have the ability to hold the read pointer irrespective of the results of step 508. These and other variations, as will be appreciated by one skilled in the art, do not depart from the spirit and scope of the present invention.

Figure 6:
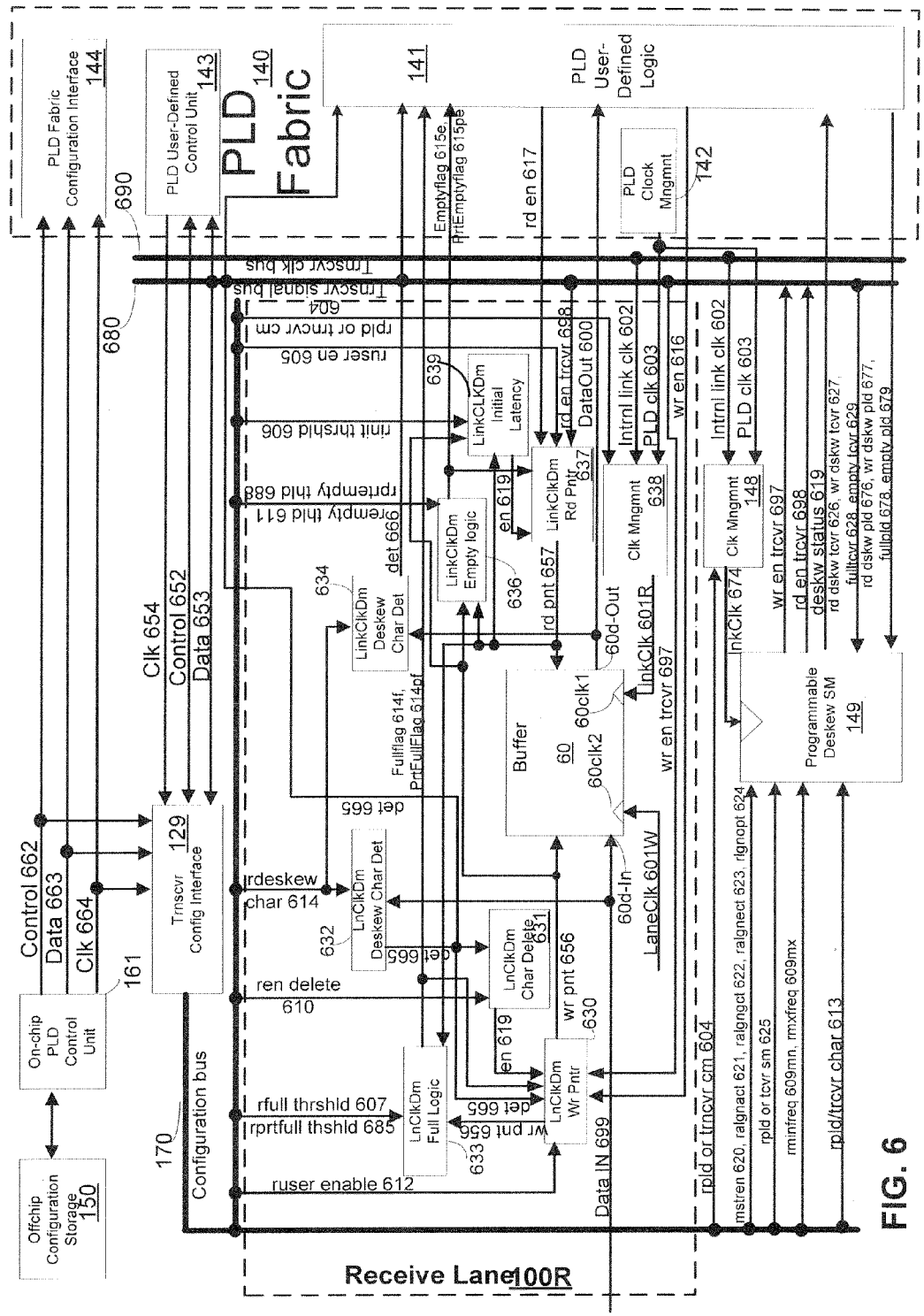
FIG. 6 illustrates receive lane deskew circuitry showing further details of the PLD transceiver of FIG. 1.

FIG. 6 illustrates details of receive lane 100R in the context of further details of transceiver 1002 and PLD 1001. Receive lane circuitry 100R includes initial latency logic 639, empty logic 636, deskew character detection logic 632 and 634, read pointer logic 637, deskew buffer 60, full logic 633, character delete logic 631, write pointer logic 630, and clock management circuitry 638. In the illustrated embodiment, programmable deskew state machine 149, along with clock management circuitry 148, is provided on a per link basis, meaning that the same state machine provides control signals across multiple receive circuitry lanes such as lane 100R. However, in alternative embodiments, a programmable deskew state machine such as state machine 149 may be provided on a lane-by-lane basis.

Logic circuitry 630, 631, 632, and 633 are clocked by a lane-based clock signal while logic circuitry 634, 636, 637, and 639 and deskew state machine 149 are clocked by a link based clock which synchronizes operations across several lanes. Deskew buffer 60 receives a lane based clock signal 601W at input 60clk2 to clock write operations and a link based clock signal 601R to clock read operations.

Initial latency logic 639 receives an initial latency threshold signal 606 from configuration bus 170. Logic 639 also receives read pointer signal 657 and write pointer signal 656. Circuitry 639 carries out the following logic: the output of block 639, enable signal 619, is initially a logical low value (or "false") until the value of write pointer 656 minus the value of read pointer 657 is greater than the value specified by initial threshold signal 606. Once that occurs, block 639 switches its output signal enable 619 to a logical high. As illustrated, enable 619 is provided to read pointer logic 637. The output of block 639 will switch to low again if the difference between the write pointer 656 and read pointer again 657 falls below the empty threshold. However, read pointer logic will not listen to the output of block 639 after its initial switch to high unless empty flag 615e subsequently becomes high, as explained further below.

Empty logic 636 receives the following values: empty threshold 611, partially empty threshold 688, write pointer 656 and read pointer 657. Empty logic 636 outputs two values based on these inputs: Empty flag 615e and partially empty flag 615pe. Empty flag 615e is a logical high value if the value of write pointer 656 minus the value of read pointer 657 is less than the value specified by empty threshold 611. Partially empty flag 615pe is a logical high value if the value of write pointer 656 minus the value of read pointer 657 is less than the value specified by partially empty threshold 688. These values (615e and 615pe) are provided to PLD user-defined logic 141 and to read pointer logic 637.

Deskew character detection logic 634 receives deskew character 614 and receives the data 600 output by deskew buffer 60 at its data output 60d-out. When block 634 detects the presence of a deskew character in the data stream, it outputs a logical high value for detect signal 666 to transceiver bus 680 and to PLD user-defined logic 141.

Read pointer logic 637 determines read pointer 657. Specifically, each clock cycle, the value of read pointer 657 is either advanced to specify the next memory location within buffer 60 or read pointer 657 is held to the same value as it was on the previous clock cycle. Read pointer logic 637 makes this determination based on the following input signals: user enable 605, read enable 617 (from PLD user defined logic 141), read enable transceiver 698 (from programmable deskew state machine 149), empty flag 615e and partially empty flag 615pe. As one skilled in the art will appreciate, the exact logic used by logic 637, may vary by application.

In one embodiment, deskew circuitry receive lane 100R is configured to address both static and dynamic skew working in conjunction with other lanes. In one example of such an embodiment, read pointer logic initially listens to enable signal 619 received from initial latency logic 639. When signal 619 is low, read pointer logic 637 holds read pointer signal 657 constant and does not advance its value. Once signal 619 goes high for the first time after system power up, read pointer logic circuitry 637 no longer listens to enable signal 619. However, if empty flag 615e received by read pointer logic 637 is a logical high value (indicating an empty condition), then read pointer logic 637 disables the read pointer (by holding the value of read pointer signal 657 from advancing) and again listens to enable signal 619 which will be low when buffer 60 is empty. Read pointer 637 holds read pointer signal 657 from advancing until enable signal 619 again goes high. If user enable signal 605 is low, then logic 637 controls read pointer 657 based on enable 619, transceiver read enable 698, and empty flag 615e. Empty flag 615e going high always triggers logic 637 to disable read pointer 657. If signal 619 (from initial latency logic 639) has gone high and no reset condition occurs (i.e. empty flag 615e remains low), then logic 637 continues to advance read pointer 657 unless enable signal 698 from programmable state machine 149 goes low.

If user enable setting 605 is a logical high, then read pointer logic 637 listens to read enable signal 617 received from PDL user-defined logic 141. In one embodiment, when partially empty flag 615pe goes high, read pointer logic 637 does not immediately disable (i.e. begin holding the value of) read pointer 657. Rather, a period of time is given for PLD user-defined logic 141 to react to the high value of partially empty flag 615pe and disable the read pointer by switching enable signal 617 from high to low. In this embodiment, if PLD user logic 141 does not disable the read pointer when a condition of partially empty occurs, empty flag 615e still provides a backup fail safe. Specifically, even if user enable signal 605 is high and the read enable signal 617 from logic 141 is high, read pointer logic 637 will hold the read pointer signal 657 if empty flag 615e goes high. When user enable 605 is high, read pointer logic 637 ignores transceiver read enable signal 698.

Turning now to the circuitry in receive lane 100R that is in lane-based clock domain, full logic 633 receives the following values: full threshold 607, partially full threshold 685, write pointer 656 and read pointer 657. Full logic 633 outputs two values based on these inputs: Full flag 614f and partially full flag 614pf. Full flag 614f is a logical high value if the value of write pointer 657 minus the value of read pointer 656 is greater than the value specified by full threshold 607. Partially full flag 614pf is a logical high value if the value of write pointer 656 minus the value of read pointer 657 is greater than the value specified by partially full threshold 685. These values (614f and 614pf) are provided to PLD user-defined logic 141 and to write pointer logic 630.

Deskew character detection logic 632 receives deskew character signal 614 which provides the identity of deskew characters. Detection circuitry 632 also receives the incoming data signal Data IN 699 from an off-chip device (or, more immediately, from a prior transceiver processing block not separately shown). When block 632 detects a deskew character in the data stream, it outputs a logical high value in detect signal 665 which is provided to character delete logic 631, to write pointer 630, to transceiver signal bus 680, and to PLD user-defined logic 141.

Character delete logic 631 receives detect signal 665 from block 632 and receives delete enable signal 610 from configuration bus 170. If delete enable configuration setting 610 is high, then character delete logic 631 deletes deskew characters when they are detected by setting enable signal 619 low when detect signal 665 is high. When delete enable 610 is low, character delete logic 631 maintains a high value for enable signal 619.

Write pointer logic 630 determines write pointer 656. Specifically, each clock cycle, write pointer 656 is either advanced to specify the next memory location within buffer 60 or it is held to the same value it was on the previous clock cycle. Write pointer logic 630 makes this determination based on the following input signals: user enable 612 (from configuration bus 170), write enable 616 (from PLD user-defined logic 141), enable 619, transceiver write enable 617 (from state machine 149), empty flag 615e and partially empty flag 615pe.

If user enable 612 is high, then write pointer logic 630 advances write pointer 656 if full flag 614f is low and write enable 616 is high. Otherwise, logic 630 holds write pointer 656. Note that when user enable 612 is high, PLD logic 141 would ordinarily be expected to switch write enable 616 to low if partially full flag 614pf is high. However, even if this does not occur, full flag 614f being provided directly to write pointer logic 630 provides a fail-safe in that write pointer logic 630 will hold the write pointer if full flag 614f is high even if user enable 612 and write enable 616 are both high. If user enable 612 is low, then write pointer 630 advances write pointer 656 if enable 619 (from character delete logic 631) is high and if both full flag 614f and partially full flag 614pf are low. When user enable 612 is high, write pointer logic 630 ignores transceiver write enable signal 697.

Clock management logic 638 selects between PLD clock 603 and internal link clock 602 under the control of signal 604 which indicates which clock should be selected. The selected clock is provided as link clock 601R to read clock input 60clk1 of deskew buffer 60.

Similarly, clock management logic 138 selects between PLD clock 603 and internal link clock 602 under the control of signal 604 which indicates which clock should be selected. The selected clock is provided as link clock 674 to a clock input of programmable deskew state machine 149.

In a particular application, routing across parts of PLD fabric 140 may be used to bond a particular group of lanes together in a single link. In such cases, signal 604 will generally be set to select PLD clock 603 as link clock 601R and as link clock 674. On the other hand, if only routing within the transceiver is being used, then signal 604 will generally be set to select internal link clock 602 as link clock 601R and link clock 674.

Programmable deskew state machine 149 manages deskew operations across the receive lanes that make up a link. State machine 149 sends signals for controlling read and write pointers in each lane, with the goal of achieving and then maintaining or re-establishing "lock," meaning a state in which incoming data across all lanes is aligned and can then be read synchronously out of the deskew buffers across those lanes. Specifically, state machine 149 sends write enable signal 697 and read enable 698 to all receive lanes in a link via transceiver signal bus 680. Those signals are received by, respectively, write and read pointer logic in each lane, including write pointer logic 630 and read pointer logic 637 in receive lane 100R. The values (low or high) of signals 697 and 698 depend in part on the configuration settings received from configuration bus 170 during configuration and in part on the various status signals received during operation from either transceiver signal bus 680 or PLD user-defined logic 141. The signals received from configuration bus 170 each correspond to a programmable configuration setting and include: master enable 620, alignments needed to achieve lock 621, alignments needed to maintain lock 622, number of bad alignments needed to lose lock 623, offset 624, PLD or transceiver state machine selection 625, minimum frequency 609mn, max frequency 609mx, and PLD or transceiver character selection 613. These configuration signals are further described in the context of FIGS. 7-8. The signals received by state machine 149 during operation from transceiver bus 680 include read deskew transceiver 626, write deskew transceiver 627, full transceiver 628, and empty transceiver 629. The signals received by state machine 149 during operation from PLD user defined logic 141 include read deskew PLD 676 write deskew PLD 677, full PLD 678, and empty PLD 629.

Signals 626 and 676 both include deskew character detection signals (e.g. signal detect 666) received from read side deskew character detection logic in each lane (e.g. detection logic 634 in lane 100R). Signals 627 and 677 both include deskew character detection signals (e.g. signal detect 665) received from write side deskew character detection logic in each lane (e.g. detection logic 632 in lane 100R). If signal 613 indicates that detection signals from transceiver routing should be used, then signals 626 and 627 are relied on by state machine 149. If signal 613 indicates that detection signals from PLD fabric routing should be used, then signals 676 and 677 are relied on by state machine 149. Signals 628 and 678 both include full and partially full flags (e.g. 614f and 614pf) received from full logic in each lane (e.g. full logic 633 in lane 100R). Signals 629 and 679 both include empty and partially empty flags (e.g. 615e and 615pe) received from empty logic in each lane (e.g. empty logic 636 in lane 100R). If signal 613 indicates that detection signals from transceiver routing should be used, then signals 628 and 629 are relied on by state machine 149. If signal 613 indicates that detection signals from PLD fabric routing should be used, then signals 678 and 679 are relied on by state machine 149.

State machine 149 provides deskew status signal 619 to PLD user defined logic 141 to indicate whether or not an alignment lock is in place. In one embodiment, configuration settings minimum frequency 609mn and maximum frequency 609mx are compared against the frequency of deskew character detection as indicated by read deskew character detection signals 626 or 676 to determine if detected frequencies are within the specified range as a double-check to qualify "good" versus "bad" alignments and qualify determination of whether alignment lock is achieved and maintained (see further description related to FIG. 8).

Those skilled in the art will appreciate that the embodiment illustrated in FIG. 6 permits advantageous configurability of various deskew receive parameters that allow receive lane circuitry 100R and programmable deskew state machine 149 to be adapted for use with various communication protocols. For example, full, partially full, empty and/or partially empty thresholds can allow the effective, or "allowed," data depth of deskew buffer 60 to be adjusted.

Some protocols might require a greater buffer depth than others to operate at peak efficiency. Moreover, even for different implementations with the same protocol, the preferred buffer depth might vary depending on whether the deskew block is being used to address static skew only or both static and dynamic skew. For implementations that address both static and dynamic skew in the deskew block, the preferred effective buffer depth might be greater than that for implementations in which the deskew block is only used to address static skew. Moreover, the illustrated embodiment allows effective buffer depth to be programmed on a lane by lane basis. As another example, the preferred initial latency threshold might vary from protocol to protocol. As another example, the preferred required criteria to require for achieving or losing alignment lock might vary by protocol and/or by application. These and other parameters can be adjusted by selecting various configuration values for the signals provided on transceiver configuration bus 170 from transceiver configuration interface 129. The illustrated embodiment also allows flexibility for selection between using either logic and routing resources within transceiver 1002 or logic and routing resources within PLD core 140. The configuration of and processing flow for the embodiment of FIG. 6 will now be discussed further with reference to FIGS. 7-9.

Figure 7:
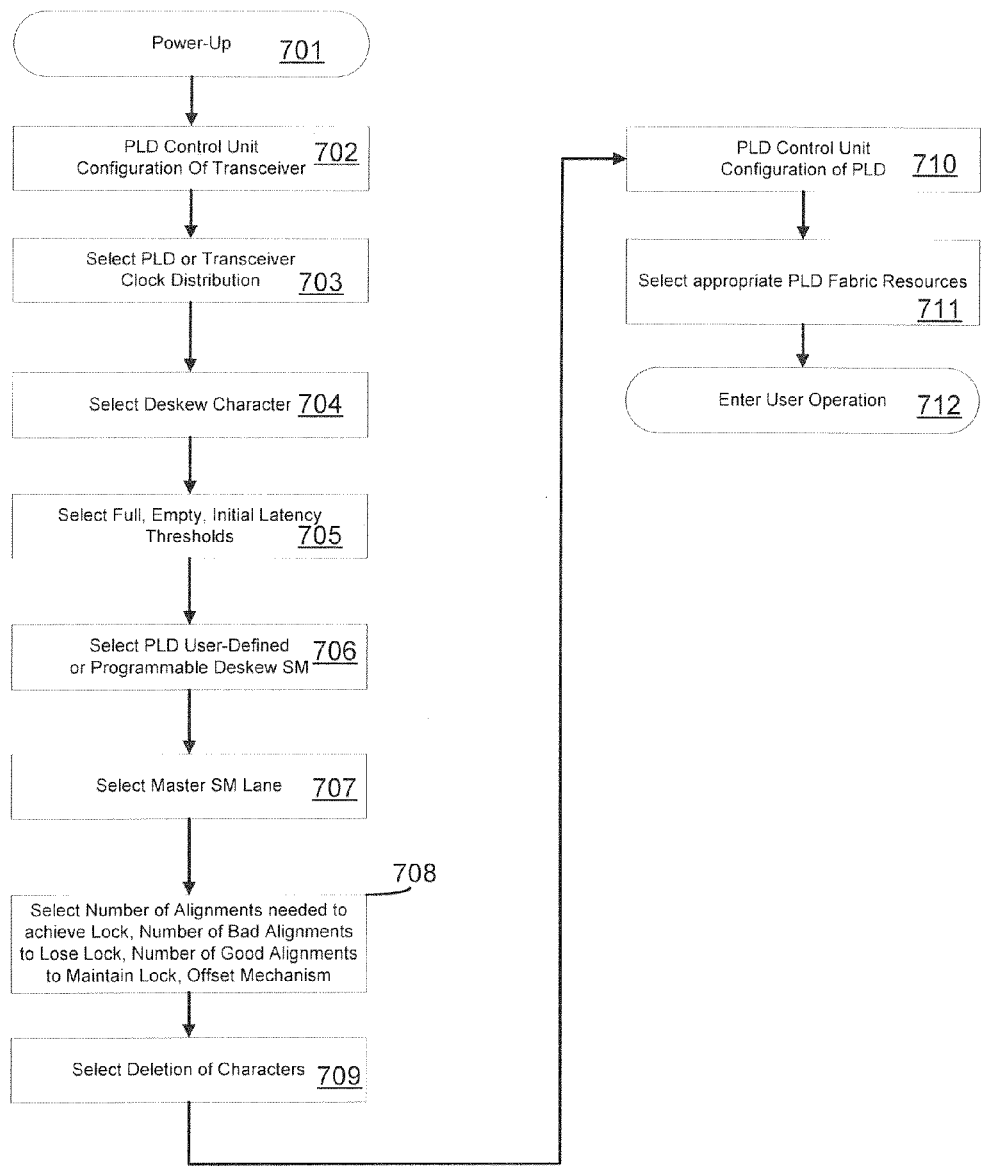
FIG. 7 illustrates a process flow of a configuration sequence for configuring settings for the receive lane circuitry illustrated in FIG. 6.

FIG. 7 illustrates a process flow 700 of a configuration sequence for configuring settings for receive lane circuitry 100R illustrated in FIG. 7. At step 701, the system including PLD 1001 of FIG. 1, which in turn includes the further details illustrated in FIG. 6, is powered up. Step 702 begins configuration of transceiver 1011 by PLD control unit 161 and/or PLD user defined control unit 143. Step 703 determines the setting for signal 604 which selects between PLD clock 603 and internal link clock 602 to run the link clock domain circuitry including the read operation of deskew buffer 60. Step 704 selects one or more deskew characters to be provided by signal 614. Step 705 selects full, partially full, empty, partially empty, and initial latency thresholds provided, respectively, by signals 607, 685, 611, 688, and 606. Step 706 selects the setting of user enable signals 612 and 611 which in turn determines whether write pointer logic 630 and read pointer logic 637 rely, respectively, on enable signals 616 and 617. Step 706 also selects the setting of signal 625 which determines whether state machine 149 relies on signals 626, 627, 628, and 629 received via transceiver routing (transceiver signal bus 680), or whether state machine 149 instead relies on signals 676, 677, 678, and 679 received from PLD core 140. Step 707 selects the setting of master enable signal 626 which determines whether state machine 149 will be used. In some embodiments, substantially identical state machines such as state machine 149 will be present with each lane (such as receive lane circuitry 100R) in the link; however, only one such state machine will be active for the link and that one active state machine (such as state machine 149) will be relied on by all the other lanes in the link. Step 708 selects settings for signals 621, 622, 623, and 624. Signal 621 determines how many alignments needed to achieve a "lock" condition (as previously described). Signal 622 determines how many good alignments are require for maintaining a lock condition. Signal 624 determines how many bad alignments result in a loss of a lock condition. Signal 624 selects between options for offsetting bad alignments with good alignments (as further explained in the context of FIG. 8). Step 709 selects a setting for signal 610 which determines whether logic 631 will delete characters. Steps 710 and 711 carry out configuration of the rest of PLD 1001 and select resources to be utilized by PLD 1001. Then, at step 712, PLD 1001 is ready for user operation. It will be appreciated by those skilled in the art that in a particular implementation, the order of the steps in a configuration sequence may be varied from that shown in FIG. 7 without departing from the spirit and scope of the present invention.

Figure 8:
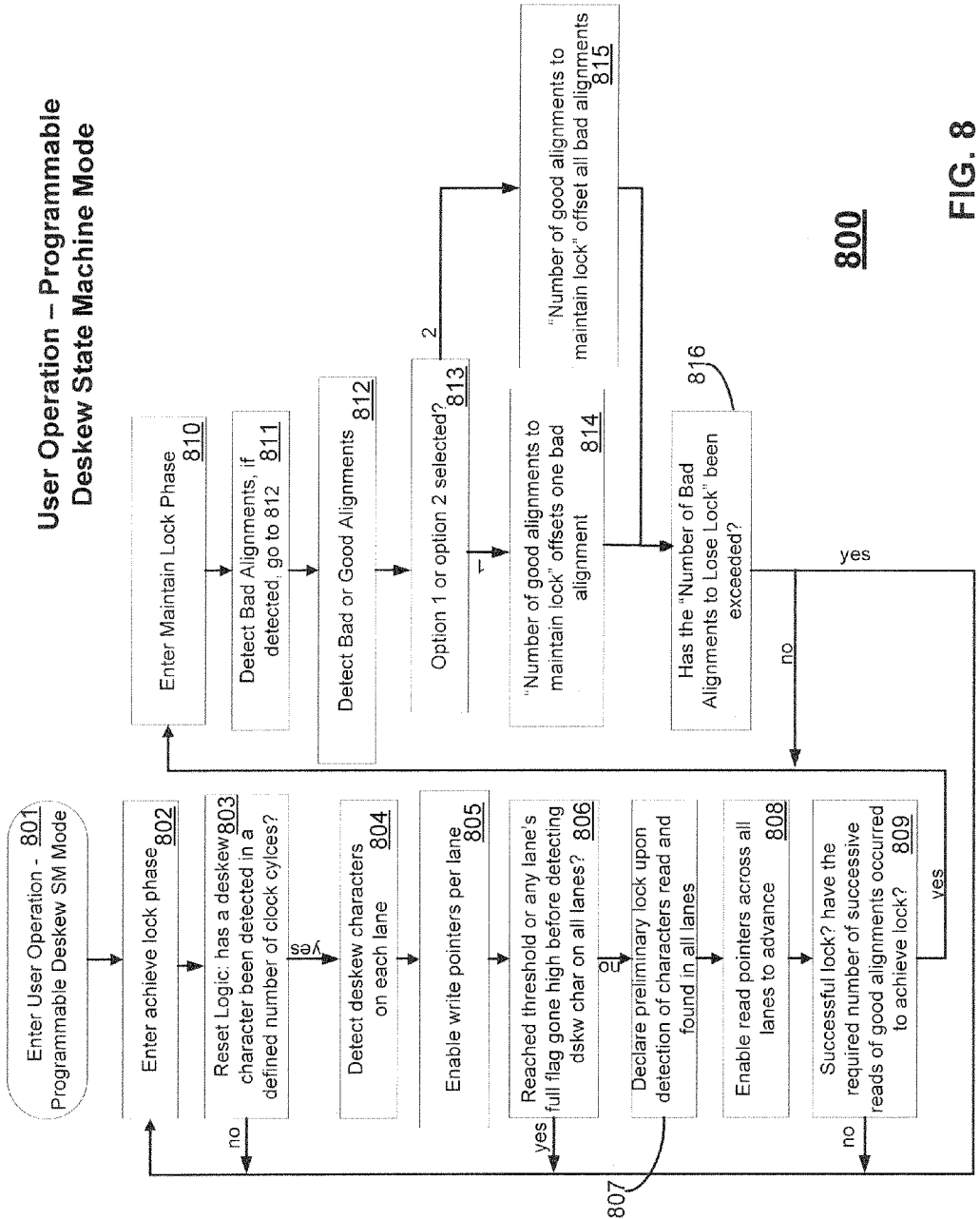
FIG. 8 illustrates a processing flow of logic implemented when the state machine illustrated in FIG. 6 controls receive alignment.

FIG. 8 illustrates a processing flow 800 of logic implemented when state machine 149 illustrated in FIG. 6 controls receive alignment in accordance with one embodiment of the present invention. At step 801, the process begins after the configuration of PLD 1001 including transceiver 1002. Step 802 enters an achieve lock phase. Step 803 determines if a deskew character has been detected on any lane within a pre-determined number of clock cycles. If no, then the process returns to step 802. If yes, then the process proceeds to steps 804 and 805. At steps 804 and 804, the process continues to detect deskew characters on each lane and write pointers are enabled (i.e. allowed to advance) per lane as deskew characters are detected. At step 806 the process determines whether either a pre-determined threshold number of clock cycles have passed or a full flag has gone high for any receive lane before deskew characters have been detected on every lane. If yes, then the process returns to step 803. If no, then the process proceeds to step 807 indicating that a preliminary lock is achieved upon detection of deskew characters in each lane. At step 808, read pointers are enabled across all lanes. At step 809, the process determines whether the number of successive good alignments that have been read reaches the required number indicated by configuration signal 621. If no, then the process returns to step 802. If yes, then a successful lock is signaled and the process proceeds to step 810 where the maintain lock phase is entered. Steps 811 detects whether any bad alignments have occurred. If any bad alignments are detected, then the process proceeds to step 812 and both bad and good alignments are detected. Step 813 determines whether option 1 or option 2 has been selected by the offset setting communicated by signal 624. If option 1, then the process invokes step 814. Step 814 allows the number of alignments to maintain lock indicated by signal 622 to offset one bad alignment. If option 2, then the process invokes step 815. Step 815 allows the number of alignments to maintain lock indicated by signal 622 to offset all bad alignments to that point. Step 816 determines if the number of bad alignments to lose lock indicated by signal 623 has been reached. If no, then the process continues the maintain lock phase by returning to step 810. If yes, then lock is lost and the process returns to step 802. It will be appreciated by those skilled in the art that in a particular implementation, the order of the steps of alternative embodiments may be varied from that shown in FIG. 8 without necessarily departing from the spirit and scope of the present invention.

Figure 9:
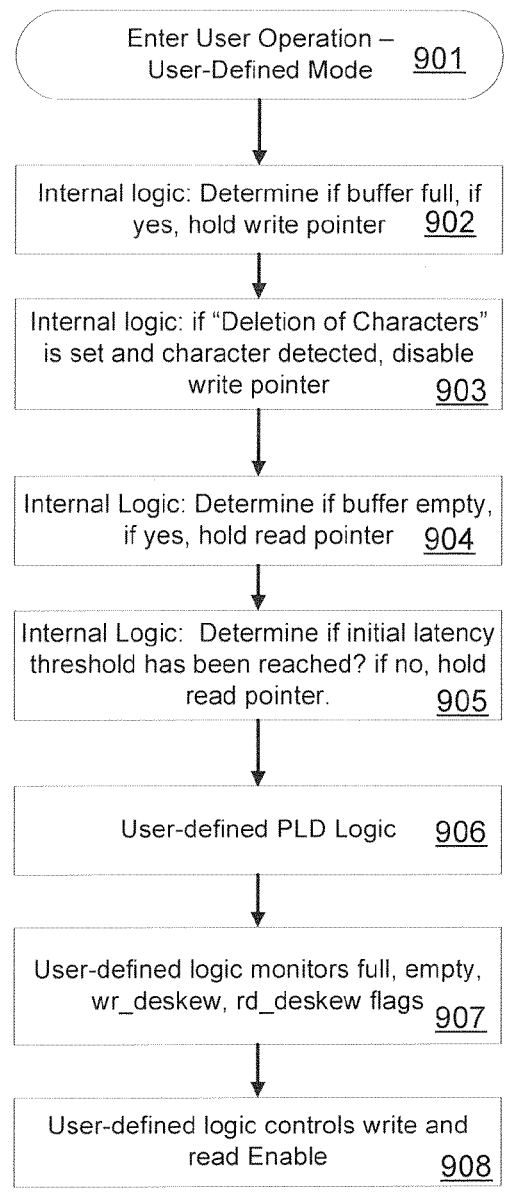
FIG. 9 illustrates a process for controlling the receive lane circuitry of FIG. 6 when user operation relies in part on user-defined logic in the PLD core.

FIG. 9 illustrates a process 900 for controlling receive lane circuitry 100R of FIG. 6 when the user operation relies in part on user defined logic in PLD in the core 140 of PLD 1001. In this exemplary embodiment, some logic internal to transceiver 1002 still has priority for controlling write and read pointers 656 and 657 and, subject to those internal logic control priorities, write and read pointers 656 and 657 may be controlled from user-defined logic in fabric 140 of PLD 1001. In one embodiment, process 900 applies when user enable signals 612 and 605 are high. Step 901 begins the process. Step 902 uses internal logic (i.e., internal to transceiver 1002) to determine if deskew buffer 60 is full. If yes, the write pointer is held from advancing. Step 903 uses internal logic to determine if deletion of characters signal 610 is high and, if yes, then deskew characters are deleted when detected. Step 904 uses internal logic to determine if deskew buffer 60 is empty and, if yes, the read pointer is held from advancing. Step 905 uses internal logic to determine if the initial latency threshold has been reached. If not, then the write pointer is held from advancing. If steps 902-905 have not indicated that read and/or write pointers should be held from advancing, then process 900 moves to step 906 and looks to user-defined logic in the PLD core to determine whether to hold or advance read and/or write pointers. Step 907 monitors full, partially full, empty and partially empty flags as well as write and read deskew flags and step 908 determines whether to hold or advance read and write pointers by controlling the values of read enable 617 and write enable 616. As those skilled in the art will appreciate, in a particular implementation, the order of the steps may be varied from that shown in FIG. 9 without departing for the spirit and scope of the present invention. Also, some or all of the steps are not necessarily performed serially. For example, once the process reaches step 908, steps 902, 903, and 904 may be ongoing and could preempt any control signals from PLD core 140 resulting from step 908. Moreover, other steps may only be performed at particular times. For example, once the initial latency threshold is reached the first time, step 905 does not need to continue determining whether that threshold has been reached unless a condition resets the applicable initial latency logic (for example, reaching an "empty" condition). However, once the initial latency logic is reset, step 905 may again have the ability to hold the read pointer irrespective of the results of step 908. These and other variations, as will be appreciated by one skilled in the art, do not depart from the spirit and scope of the present invention.

Figure 10:
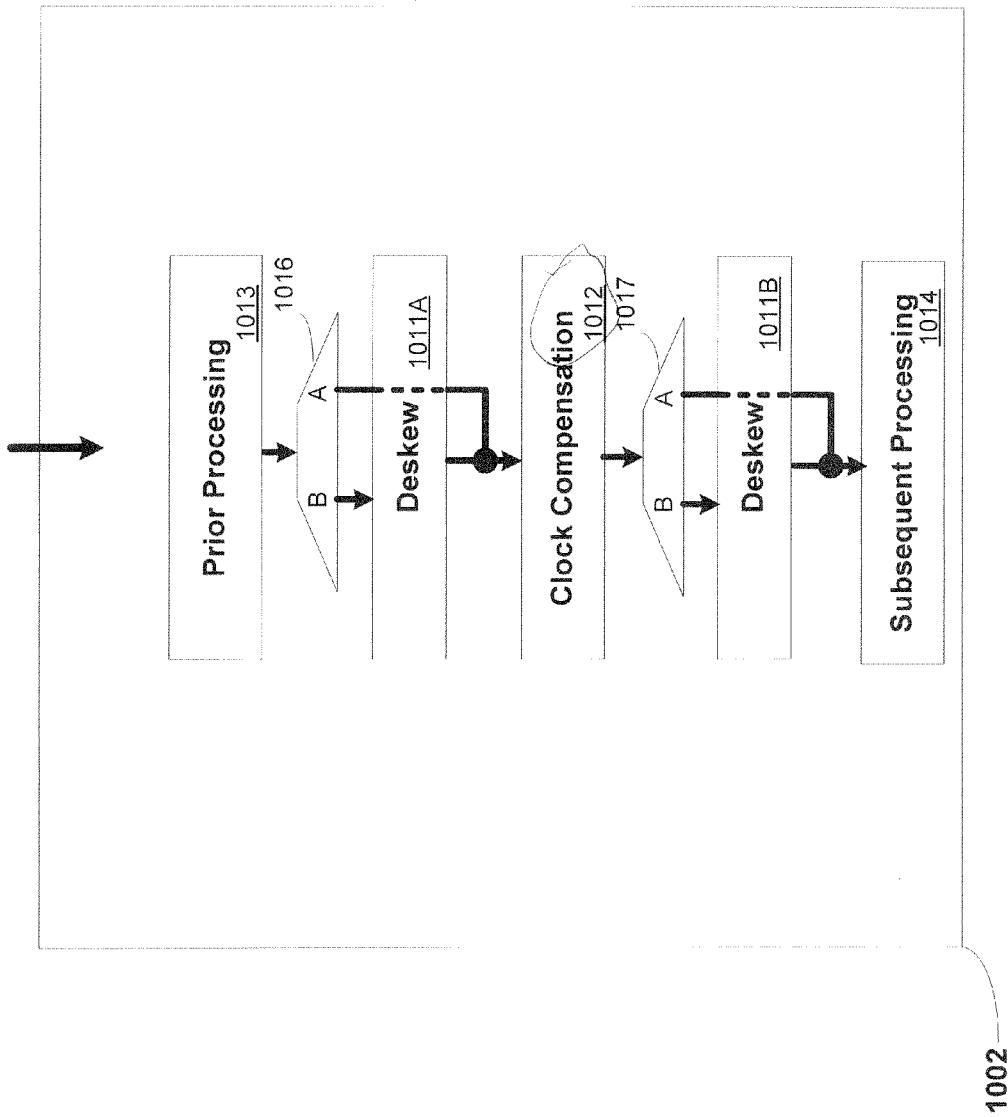
FIG. 10 illustrates additional aspects of transceiver 1002 of FIG. 1 in accordance with one embodiment of the present invention. The additional aspects relate to configurability allowing the transceiver to work with one of a plurality of communication protocols.

FIG. 10 illustrates additional aspects of transceiver 1002 of FIG. 1 in accordance with one embodiment of the present invention. In particular, FIG. 10 illustrates an embodiment that facilitates re-configuration such that the same transceiver can be reconfigured for use with a selected one of two protocols where the two protocols have different requirements for the order of clock compensation and deskew processing. For example, the 40/100 Gigabit Ethernet protocol requires that deskew occur prior to clock compensation. On the other hand, the PCI Express Gen 3 protocol requires that clock compensation occur prior to deskew.

As illustrated, transceiver 1002 includes receive processing circuitry including prior processing block 1013, deskew block 1011A, clock compensation block 1012, deskew block 1011B, subsequent processing block 1014, and selection circuitry 1016 and 1017, all coupled as shown. In the illustrated embodiment, receive deskew blocks 1011A and 1011B are substantially similar to each other and each include lane-based circuitry including circuitry similar to receive lane circuitry 100R illustrated in FIG. 6.

The arrangement illustrated in FIG. 10 allows for selective bypass of one or the other of the illustrated duplicative deskew blocks so that clock compensation can selectively occur either before or after deskew processing. This helps facilitate transceiver 1002 be reconfigurable to adapt to different protocols.

For example, if transceiver 1002 is being programmed to operate with the 40/100 Gigabit Ethernet protocol, selection circuitry 1016 would be configured to select its "B" output while selection circuitry 1017 would be configured to select its "A" output. In this manner, deskew block 1011A would be utilized and deskew block 1011B would be bypassed so that deskew occurs prior to clock compensation as required by the 40/100 Gigabit Ethernet protocol.

By contrast, if transceiver 1002 is being programmed to operate with the PCI Express Gen 3 protocol, selection circuitry 1016 would be configured to select its "A" output while selection circuitry 1017 would be configured to select its "B" output. In this manner, deskew block 1011A would be bypassed and deskew block 1011B would be utilized so that deskew occurs after clock compensation as required by the PCI Express Gen 3 protocol.

Those skilled in the art will appreciate that there are many variations on the embodiment illustrated in FIG. 10 that can be implemented without departing from the spirit and scope of the present invention. To cite one example, although the illustrated embodiment utilizes de-multiplexer circuitry as selection circuitry, in alternative embodiments, configurable bypass may be implemented with multiplexer circuitry rather than demultiplexer circuitry. For example, a multiplexer may be used to select input from either a bypassable block or a block prior to the bypassable block. To cite yet another example, instead of implementing duplicate deskew blocks, similar multi-protocol configurability can be accomplished by implementing duplicate clock compensation blocks (rather than duplicate deskew processing blocks) along with selection circuitry. In such an alternative, the transceiver could be reconfigured to selectively bypass one or the other of the clock compensation blocks to allow clock compensation to occur either before or after deskew processing depending upon the protocol for which the transceiver is being configured. Those skilled in the art will appreciate that these and other variations do not depart from the spirit and scope of the invention.

Transceiver 1002, including transceiver configuration interface 129 and deskew circuitry 1011, shown in FIG. 1 (with further transmit and receive circuitry details shown in FIGS. 2 and 6) may be implemented as part of a transceiver in any IC that supports transceiver configuration. Such configuration may be accomplished via data stored in programmable elements on the IC. Programmable elements may include dynamic or static RAM, flip-flops, electronically erasable programmable read-only memory (EEPROM) cells, flash, fuse, anti-fuse programmable connections, or other memory elements. Transceiver configuration may also be accomplished via one or more externally generated signals received by the IC during operation of the IC. Data represented by such signals may or may not be stored on the IC during operation of the IC. Transceiver configuration may also be accomplished via mask programming during fabrication of the IC. While mask programming may have disadvantages relative to some of the field programmable options already listed, it may be useful in certain high volume applications.

A specific example of an IC that supports transceiver configuration is a PLD. PLDs (also referred to as complex PLDs, programmable array logic, programmable logic arrays, field PLAs, erasable PLDs, electrically erasable PLDs, logic cell arrays, field programmable gate arrays, or by other names) provide the advantages of fixed ICs with the flexibility of custom ICs. PLDs have configuration elements (i.e., programmable elements) that may be programmed or reprogrammed. Placing new data into the configuration elements programs or reprograms the PLD's logic functions and associated routing pathways.

Figure 11:
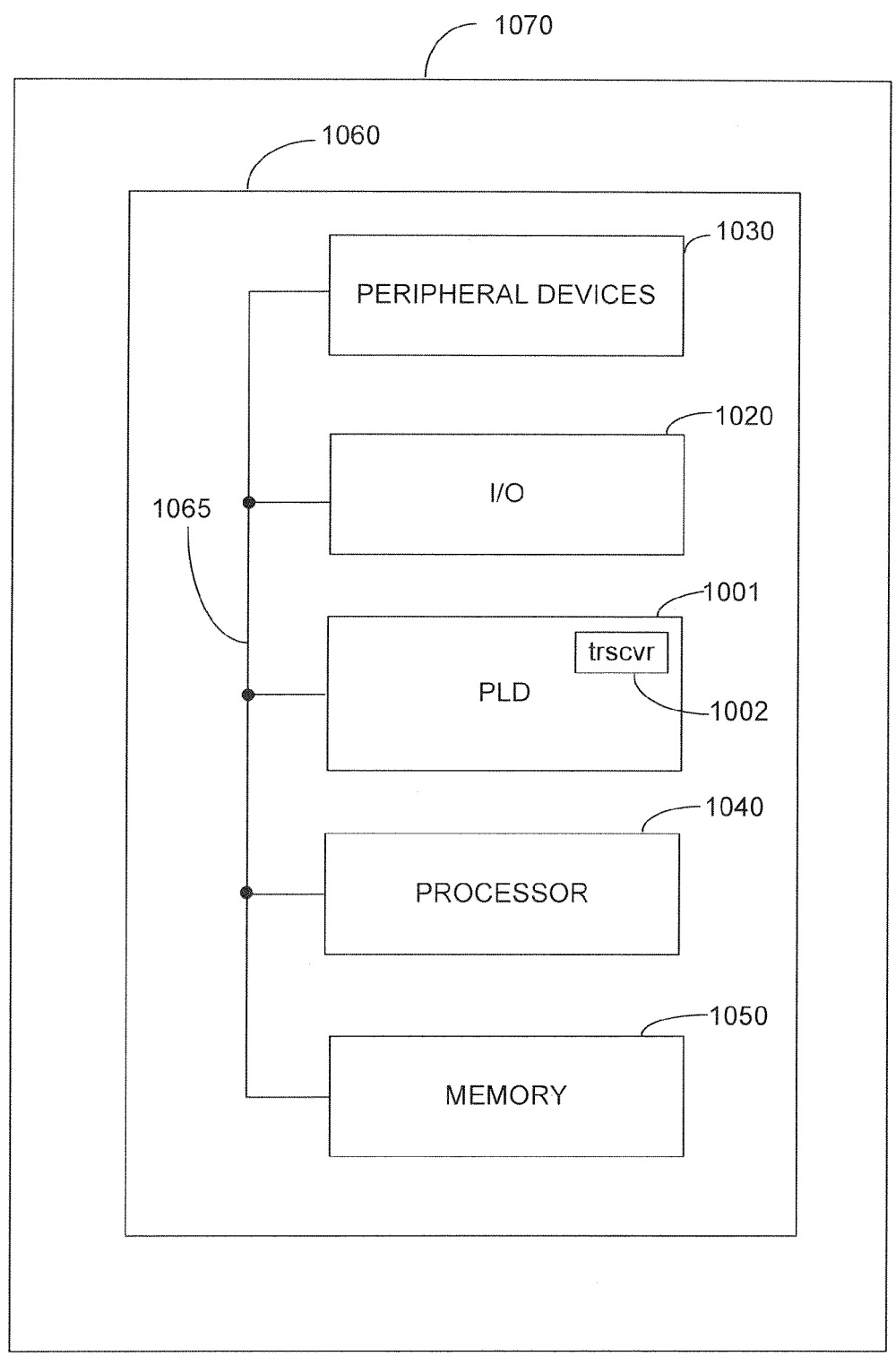
FIG. 11 illustrates an exemplary data processing system including the PLD of FIG. 1.

FIG. 11 illustrates an exemplary data processing system 1000 including PLD 1001. PLD 1001 includes transceiver 1002. For illustration, only a single transceiver is shown, however, a PLD such as PLD 1001 may include multiple transceivers such as transceiver 1002.

Data processing system 1000 may include one or more of the following additional components: processor 1040, memory 1050, input/output (I/O) circuitry 1020, and peripheral devices 1030 and/or other components. These components are coupled together by system bus 1065 and are populated on circuit board 1060 which is contained in end-user system 1070. A data processing system such as system 1000 may include a single end-user system such as end-user system 1070 or may include a plurality of systems working together as a data processing system.

System 1000 can be used in a wide variety of applications, such as computer networking, data networking, instrumentation, video processing, digital signal processing, or any other application where the advantage of using programmable or reprogrammable logic in system design is desirable. PLD 1001 can be used to perform a variety of different logic functions. For example, PLD 1001 can be configured as a processor or controller that works in cooperation with processor 1040 (or, in alternative embodiments, a PLD might itself act as the sole system processor). PLD 1001 may also be used as an arbiter for arbitrating access to shared resources in system 1000. In yet another example, PLD 1001 can be configured as an interface between processor 1040 and one of the other components in system 1000. It should be noted that system 1000 is only exemplary.

In one embodiment, system 1000 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but only by the following claims.

What is claimed is:

1. A transceiver in an integrated circuit ("IC") with configurable deskew circuitry, the configurable deskew circuitry comprising:
    a plurality of buffers corresponding to a plurality of respective data lanes; and
    configurable circuitry coupled to the plurality of buffers to allow adjustment of an effective data depth of each of the plurality of buffers,
    wherein the effective data depth includes an empty threshold and the configurable circuitry includes circuitry for controlling a read pointer in accordance with a selected empty threshold such that a read pointer is permitted to advance when a difference between write and read pointers is greater than the empty threshold, the read pointer otherwise not being permitted to advance, the write and read pointers corresponding to, respectively, a memory location to be written and a memory location to be read in a buffer, and wherein the effective data depth further includes a partially empty threshold and the configurable circuitry further includes circuitry adapted to control the read pointer in accordance with a selected partially empty threshold such that the read pointer is permitted to advance when a difference between write and read pointers is greater than the partially empty threshold.

2. The transceiver of claim 1 wherein the configurable circuitry comprises a plurality of circuitry blocks each corresponding to a respective data lane such that the effective data depth of a buffer in one lane can be configured to be different than an effective data depth of a buffer in another lane.

3. The transceiver of claim 1 wherein the read pointer not being permitted to advance when the difference between write and read pointers is less than or equal to the partially empty threshold and greater than the empty threshold and characters to be deleted are detected.

4. The transceiver of claim 3 wherein the characters to be deleted include idle characters.

5. The transceiver of claim 3 wherein the characters to be deleted include deskew characters.

6. The transceiver of claim 1 wherein the data depth threshold includes an initial latency threshold and the configurable circuitry is coupled to initially not advance a read pointer until a difference between write and read pointer values is greater than the initial latency threshold.

7. A transceiver in an integrated circuit ("IC") with configurable deskew circuitry, the configurable deskew circuitry comprising:
    a plurality of buffers corresponding to a plurality of respective data lanes; and
    configurable circuitry coupled to the plurality of buffers to allow adjustment of an effective data depth of each of the plurality of buffers,
    wherein the effective data depth includes a full threshold and the configurable circuitry includes circuitry for controlling a write pointer in accordance with a selected full threshold such that a write pointer is permitted to advance when a difference between write and read pointers is less than the full threshold, the write pointer otherwise not being permitted to advance, the write and read pointers corresponding to, respectively, a memory location to be written and a memory location to be read in a buffer, and wherein the effective data depth further includes a partially full threshold and the configurable circuitry further includes circuitry adapted to control the write pointer in accordance with a selected partially full threshold such that the write pointer is permitted to advance when a difference between write and read pointers is less than the partially full threshold.

8. The transceiver of claim 7 wherein the write pointer not being permitted to advance when the difference between write and read pointers is greater than or equal to the partially full threshold and less than the full threshold and characters to be deleted are detected.

9. The transceiver of claim 8 wherein the characters to be deleted include idle characters.

10. The transceiver of claim 8 wherein the characters to be deleted include deskew characters.

11. A transceiver in an integrated circuit ("IC") with configurable deskew circuitry, the configurable deskew circuitry comprising:
    a plurality of buffers corresponding to a plurality of respective receive data lanes; and
    a programmable state machine adapted to control read and write pointer circuitry in the plurality of receive data lanes in accordance with configuration data defining requirements for a data alignment lock condition, the data alignment lock condition relating to sufficient alignment of data across the plurality of respective receive data lanes,
    wherein the requirements of the data alignment lock condition include a required number of good data alignments to achieve the lock condition, wherein the state machine is adapted such that the requirements for the data alignment lock condition further include a required number of good data alignments to maintain the lock condition, wherein the state machine is adapted such that requirements for the data alignment lock condition further include a required number of bad data alignments to lose the lock condition, wherein the programmable state machine is adapted such that the requirements for the data alignment lock condition further include an offset condition determining offset of bad alignments by a selected number of successive good alignments, and wherein the offset condition is selectable between at least a first option and a second option, the first option allowing offset of one bad alignment by the selected number of successive good alignments, and the second option allowing offset of a plurality of bad alignments by the selected number of successive good alignments.

12. The transceiver of claim 11 wherein the selected number of successive good alignments is the required number of good data alignments to maintain the lock condition.

13. A programmable logic device comprising the transceiver of claim 1.

14. A data processing system comprising the programmable logic device of claim 13.

15. A method of deskewing data in a plurality of receive data lanes, the method comprising:

controlling read and write pointer circuitry in the plurality of receive data lanes in accordance with requirements for a data alignment lock condition, the data alignment lock condition relating to sufficient alignment of data across the plurality of receive data lanes, wherein the requirements for the data alignment lock condition include a required number of good data alignments to achieve the lock condition, wherein the requirements for the data alignment lock condition further include a required number of good data alignments to maintain the lock condition, wherein the requirements for the data alignment lock condition further include a required number of bad data alignments to lose the lock condition, wherein the requirements for the data alignment lock condition further include an offset condition determining offset of bad alignments by a selected number of successive good alignments, and wherein the offset condition is selectable between at least a first option and a second option, the first option allowing offset of one bad alignment by the selected number of successive good alignments, and the second option allowing offset of a plurality of bad alignments by the selected number of successive good alignments.

16. The method of claim 15 wherein the selected number of successive good alignments is the required number of good data alignments to maintain the lock condition.

\* \* \* \* \*